(12) United States Patent
Park et al.

(10) Patent No.: US 9,158,165 B2
(45) Date of Patent: Oct. 13, 2015

(54) DISPLAY DEVICE HAVING PLURALITY OF CHARGE SHARE GATE LINES

(75) Inventors: Kee-Bum Park, Cheonan-si (KR); Si Hyun Ahn, Cheonan-si (KR); Kyong Sik Choi, Cheonan-si (KR); Seon-Kyoon Mok, Hwaseong-si (KR); Eun Cho, Cheonan-si (KR)

(73) Assignee: SAMSUNG DISPLAY CO., LTD. (KR)

(*) Notice: Subject to any disclaimer, the term of this patent is extended or adjusted under 35 U.S.C. 154(b) by 631 days.

(21) Appl. No.: 12/964,104

(22) Filed: Dec. 9, 2010

(65) Prior Publication Data

US 2011/0216260 A1    Sep. 8, 2011

(30) Foreign Application Priority Data

Mar. 8, 2010    (KR) .................. 10-2010-0020396

(51) Int. Cl.
G09G 3/36    (2006.01)
G02F 1/136    (2006.01)

(52) U.S. Cl.
CPC ........................................ *G02F 1/136* (2013.01)

(58) Field of Classification Search
CPC .................. G09G 2300/0413; G09G 3/3655
USPC .................. 345/87, 90, 100; 377/64–81
See application file for complete search history.

(56) References Cited

U.S. PATENT DOCUMENTS

| | | | |
|---|---|---|---|
| 2007/0018919 A1* | 1/2007 | Zavracky et al. | 345/87 |
| 2007/0046613 A1 | 3/2007 | Ha et al. | |
| 2007/0200815 A1 | 8/2007 | Yeh | |
| 2008/0303768 A1* | 12/2008 | Do et al. | 345/90 |
| 2009/0027325 A1 | 1/2009 | Kim et al. | |
| 2009/0135322 A1 | 5/2009 | Kim et al. | |
| 2009/0225018 A1* | 9/2009 | Kim | 345/90 |
| 2010/0033470 A1 | 2/2010 | Lee et al. | |
| 2010/0053489 A1* | 3/2010 | Kang et al. | 349/48 |

FOREIGN PATENT DOCUMENTS

| | | |
|---|---|---|
| DE | 102006027401 | 3/2007 |
| GB | 2429569 | 2/2007 |
| JP | 2007058177 | 3/2007 |
| KR | 1020070016059 | 2/2007 |
| KR | 1020070023099 | 2/2007 |
| KR | 1020070042337 | 4/2007 |
| KR | 1020090054070 | 5/2009 |

* cited by examiner

*Primary Examiner* — Dennis Joseph
(74) *Attorney, Agent, or Firm* — Cantor Colburn LLP

(57) ABSTRACT

A display device includes a plurality of gate lines arranged substantially parallel to each other in a first direction; a plurality of charge share gate lines arranged substantially parallel to each other in the first direction; a plurality of data lines arranged substantially parallel to each other in a second direction, wherein the second direction is substantially perpendicular to the first direction; and a plurality of pixels arranged in a matrix form in along the first direction and the second direction and each of the plurality of pixels which includes a first switching element and a second switching element, wherein the a first gate line of the plurality of gate lines is electrically connected to the first switching element included in one individual pixel of the plurality of pixels, and the a second gate line of the plurality of gate lines is electrically connected to the second switching element included in the individual pixel of the plurality of pixels.

26 Claims, 12 Drawing Sheets

DISPLAY DEVICE HAVING PLURALITY OF
CHARGE SHARE GATE LINES

This application claims priority to Korean Patent Application No. 10-2010-0020396, filed on Mar. 8, 2010, and all the benefits accruing therefrom under 35 U.S.C. §119, the content of which in its entirety is herein incorporated by reference.

BACKGROUND OF THE INVENTION (1) Field of the Invention

The present invention generally relates to a display device.

(2) Description of the Related Art

An active matrix type display device generally includes a row driving circuit and a column driving circuit to drive pixels arranged in a matrix, i.e., in row and column directions. Different types of active matrix type display devices include a liquid crystal display ("LCD"), a plasma display panel ("PDP"), an organic light emitting diode display device ("OLED"), and various other types of display devices.

Among the various kinds of active matrix type devices, a viewing angle is an important factor in determining quality of a display device. To widen the viewing angle of the LCD, a liquid crystal material, a pixel-structure, and a driving method to realize a wide viewing angle have been developed. To realize a wide viewing angle, one pixel is typically divided into at least two sub-pixels, and each sub-pixel is applied with different data voltages such that liquid crystal molecules included in each sub-pixel are arranged in different directions from each other. In this case, if each sub-pixel included in one pixel is connected to different data column wiring or is connected to different gate row wiring to apply the different data voltages to each sub-pixel, respectively, the number of gate wires in the gate wiring and data wires in the data wiring included in the LCD is increased such that an aperture ratio of each pixel is decreased, and the number of driving circuits is increased, and thereby manufacturing costs of the LCD are increased. Therefore, a display device realizing a wide viewing angle without increasing the number of driving wires is needed.

BRIEF SUMMARY OF THE INVENTION

The present invention generally provides a display device which realizes a wide viewing angle and a driving method which can drive a sub-pixel of a pixel included in the display device without increasing a driving wiring.

An exemplary embodiment of a display device according to the present invention includes a plurality of gate lines arranged parallel to each other in a first direction, a plurality of charge share gate lines arranged parallel to each other in the first direction, a plurality of data lines arranged parallel to each other in a second direction, where the second direction is substantially perpendicular to the first direction, and a plurality of pixels arranged in a matrix form along the first direction and the second direction, wherein the plurality of pixels each includes a first switching element and a second switching element, wherein a first gate line of the plurality of gate lines is electrically connected to the first switching element and a second gate line of the plurality of gate lines is electrically connected to the second switching element included in the pixel including the first switching element. In one exemplary embodiment, the display device may further include a gate driver supplying a first gate signal to the first gate line and a second gate signal to the second gate line, the first gate signal and the second gate signal include a turn-on voltage and a turn-off voltage, and a period when the first gate signal is the turn-on voltage and a period when the second gate signal is the turn-on voltage do not entirely overlap each other. In one exemplary embodiment, the first gate line may be electrically connected to the first switching element of one pixel of the plurality of pixels, and may be electrically connected to the second switching element of another pixel the plurality of pixels. In one exemplary embodiment, the second gate line may be electrically connected to the first switching element of one pixel the plurality of pixels, and may be electrically connected to the second switching element of another pixel of the plurality of pixels. In one exemplary embodiment, the first switching element may be electrically connected to at least one data line of the plurality of data lines, and a pixel of the plurality of pixels may further include a third switching element. In one exemplary embodiment, the third switching element may be electrically connected to a same data line and a same gate line connected to the first switching element, and the third switching element and the second switching element may be electrically connected to each other.

An exemplary embodiment of a display device according to the present invention includes a liquid crystal panel assembly including a plurality of pixels disposed in a display area, where the plurality of pixels are each connected to a gate line and a charge share gate line; and a gate driver applying a gate voltage to the gate line and the charge share gate line, wherein the gate voltage applied through the gate line and the gate voltage applied through the charge share gate line in one pixel of the plurality of pixels each have a gate-on voltage period, wherein the gate-on voltage period of the gate line and the gate-on voltage period of the charge share gate line are not entirely overlapped each other.

The plurality of pixels may include a plurality of pixel rows disposed in the display area and each arranged in one line, and each pixel row may be connected to one gate line and one charge share gate line.

The gate driver may include a plurality of stages, and the plurality of stages may include a plurality of general stages, i.e., non-dummy stages, connected to gate lines one by one.

Outputs of the plurality of general stages connected to the gate lines one by one may be connected to charge share gate lines one by one.

In one exemplary embodiment, three stages may exist between two stages connected to one gate line and one charge share data line, respectively, wherein the gate line connected to one stage and the charge share data line connected to the other stage are connected to one pixel row.

In one exemplary embodiment, the plurality of pixels may further include a plurality of dummy pixel rows disposed on one side of a liquid crystal panel assembly, and each dummy pixel row is arranged in one line.

In one exemplary embodiment, the plurality of dummy pixel rows may have a same structure as that of the plurality of pixel rows.

In one exemplary embodiment, the plurality of stages may further include a plurality of dummy stages connected to the dummy pixels one by one.

The plurality of dummy stages may be connected to the charge share gate lines connected to the plurality of pixel rows one by one.

In one exemplary embodiment, the plurality of pixels may further include a plurality of dummy cap pixel rows disposed on the other side of the liquid crystal panel assembly, and each row of the plurality of dummy cap pixel rows arranged in one line.

The plurality of dummy cap pixel rows may be each connected to a stage of the plurality of stages that is not connected to a charge share gate line of the plurality of pixel rows.

Each dummy cap pixel row may be formed to have a same capacitance or impedance as general pixel rows based on a structure where the charge share gate line is a central portion in the structure of the pixel row.

In one exemplary embodiment, the display device may further include a plurality of data lines which is disposed substantially perpendicular to the gate lines and the charge share gate lines, a first switching element including a first transistor and a second switching element including a second transistor each connected to a gate line and a data line, a first sub-pixel electrode connected to the first transistor, a second sub-pixel electrode connected to the second transistor, and a third switching element connected to the second sub-pixel electrode and the charge share gate line.

In one exemplary embodiment, the display device may further include a charge share capacitor, and one terminal of the third switching element is connected to the charge share capacitor.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

Figure 1:
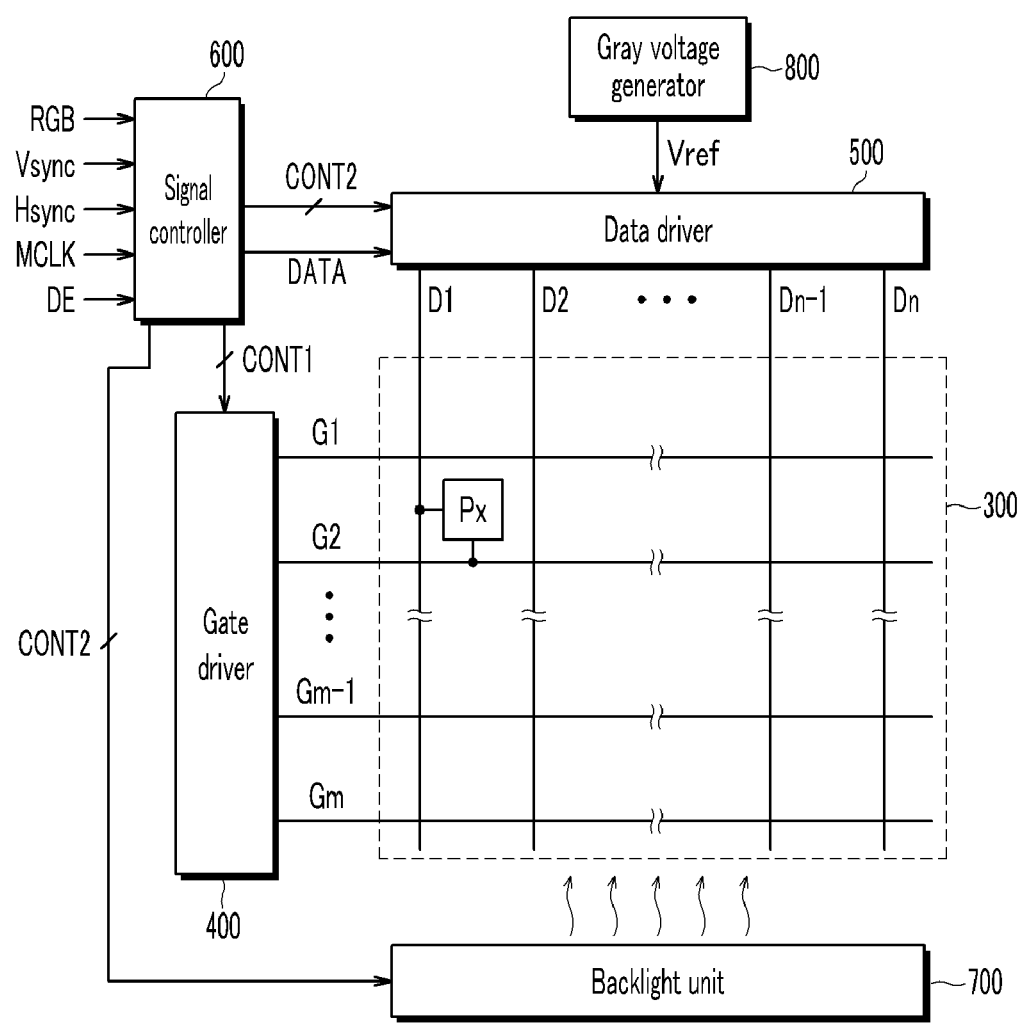
FIG. 1 is a block diagram of an exemplary embodiment of a display device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In the following exemplary embodiments of the present invention, a description of a liquid crystal display ("LCD") will be provided as an example of the display device with reference to FIG. 1, although one of ordinary skill in the art would understand that alternative display types may also be applicable. FIG. 1 is a block diagram of an exemplary embodiment of an LCD according to the present invention. Referring to FIG. 1, an LCD according to an exemplary embodiment of the present invention includes a liquid crystal panel assembly 300, a gate driver 400, a data driver 500, a signal controller 600, a backlight unit 700, and a gray voltage generator 800.

Referring to FIG. 1, an exemplary embodiment of the liquid crystal panel assembly 300 includes a plurality of signal lines G1-Gm and D1-Dn, and a plurality of pixels Px connected to the plurality of signal lines and arranged in a matrix shape. The signal lines G1 to Gm and D1 to Dn include a plurality of gate lines G1 to Gm for delivering gate signals (also referred to as "scan signals") and a plurality of data lines D1 to Dn for delivering data signals. The gate lines G1 to Gm extend in a row direction and are substantially parallel to each other, and the data lines D1 to Dn extend in a column direction and are substantially parallel to each other.

Still referring to FIG. 1, the gray voltage generator 800 generates all gray voltages to be used in the display or a predetermined number of gray voltages Vref (also referred to as "reference gray voltages") applied to the pixels Px. In one exemplary embodiment, the gray voltages may include one set of gray voltages having a positive value for a first voltage, and another set of gray voltages having a negative value for a second voltage.

The gate driver 400 is connected to the plurality of gate lines G1-Gm of the liquid crystal panel assembly 300, and applies a gate signal which may be either a gate-on voltage Von (also referred to as "turn-on voltage") and a gate-off voltage Voff (also referred to as "turn-off voltage") to the gate lines G1-Gm.

The data driver 500 is connected to the plurality of data lines D1-Dn of the liquid crystal panel assembly 300, and selects a gray voltage generated from the gray voltage generator 800 and applies the gray voltage as a data voltage (also referred to as an "image data voltage") to the plurality of data lines D1-Dn. However, in an exemplary embodiment in which the gray voltage generator 800 provides a limited number of reference gray voltage instead of all the gray voltages, the data driver 500 generates a desired data voltage by dividing the reference gray voltages. The backlight unit 700 provides light to the liquid crystal panel assembly 300. The signal controller 600 controls the gate driver 400, the data driver 500, and the backlight unit 700.

In one exemplary embodiment, each of the drivers 400, 500, 600, 700, and 800 may be directly disposed on the liquid crystal panel assembly 300 in a form of at least one integrated circuit ("IC") chip, or may be disposed on a flexible printed circuit film (not shown) and then disposed on the liquid crystal panel assembly 300 in a form of a tape carrier package ("TCP"), or may be disposed on a separate printed circuit board (not shown) or various other configurations as would be apparent to one of ordinary skill in the art. Alternatively, the drivers 400, 500, 600, 700, and 800 may be integrated with the liquid crystal panel assembly 300 together with the signal lines G1-Gn and D1-Dm and thin film transistor ("TFT") switching elements, for example. In one exemplary embodiment, all or some of the drivers 400, 500, 600, 700 and 800 may be integrated into a single chip. In one exemplary embodiment, at least one of the drivers or at least one circuits forming the drivers may be arranged outside the single chip.

Next, an operation of an LCD will be described.

The signal controller 600 receives red (R), green (G) and blue (B) input image signals and an input control signal to control the display of the image signals R, G and B from a graphics controller (not shown). The input image signals R, G and B contain luminance information of each of the plurality of pixels Px. The luminance has a predetermined number of grays, such as $1024=2^{10}$, $256=2^8$, or $64=2^6$, for example. In one exemplary embodiment, the input control signals may include a vertical synchronization signal Vsync, a horizontal synchronizing signal Hsync, a main clock signal MCLK, a data enable signal DE, and other similar signals, for example.

The signal controller 600 processes the input image signals R, G and B in such a way to be suitable for operating conditions of the display panel unit 300 based on the input image signals, and generates a gate control signal (also referred to as an "image scan control signal") CONT1 and a data control signal (also referred to as an "image data control signal") CONT2. The signal controller 600 outputs the gate control signal CONT1 to the gate driver 400, and outputs the data control signal CONT2 and compensation image signals R', G' and B' to the data driver 500.

The image scan control signal CONT1 includes an image scanning start signal STV to instruct of the start of image scanning, and at least one clock signal to control an output cycle of the gate-on voltage Von. In one exemplary embodiment, the image scan control signal CONT1 may further include an output enable signal OE to define a sustaining time of the gate-on voltage.

The image data control signal CONT2 includes a horizontal synchronization start signal STH informing of the transmission start of a digital image data DATA for one row of pixels PX, and a load signal LOAD to instruct an analog data voltage to be applied to the plurality of data lines D1-Dm. In one exemplary embodiment, the data control signal CONT2 may further include an inversion signal RVS that inverts the voltage polarity of the data voltage with respect to a common voltage Vcom. The data driver 500 receives digital image signals DATA, and selects a gray scale voltage corresponding to each digital image signal DATA to convert the digital image signals DATA into analog data signals. The data driver 500 applies the converted analog data signals to the corresponding data lines D1 to Dm.

Figure 2:
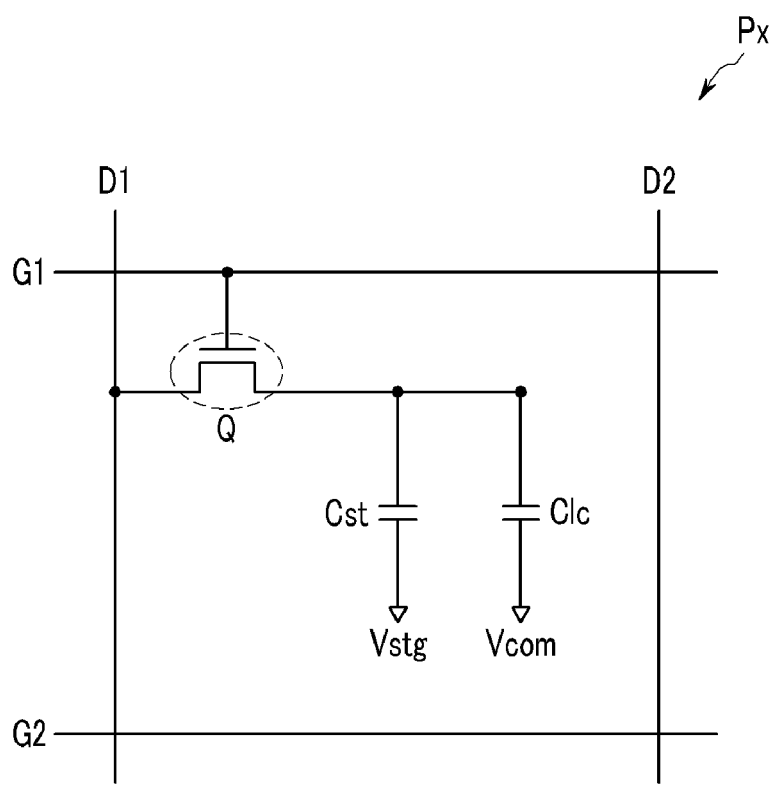
FIG. 2 is an equivalent circuit diagram of an exemplary embodiment of one pixel according to the present invention.

Referring to FIGS. 1 and 2, an exemplary embodiment of the gate driver unit 400 applies a gate-on voltage Von to the gate lines G1-Gm according to the gate control signal CONT1 transmitted from the signal controller 600 to turn on switching devices Q connected to the gate lines G1-Gm. Data voltages applied to the data lines D1-Dn are then supplied to the corresponding pixels Px through the turned-on switching element Q.

A difference between the data voltage applied to the pixel Px and the common voltage Vcom is represented as a charging voltage (also referred to as a "pixel voltage") of a liquid crystal capacitor Clc. The liquid crystal capacitor includes a liquid crystal layer including liquid crystal molecules, and a plurality of electrodes formed on both sides of the liquid crystal layer. Alignment of the liquid crystal molecules varies according to a magnitude and polarity of the pixel voltage such that light emitted from the backlight unit 700 may be passed through the liquid crystal layer. Polarization of the passing light is changed according to the arrangement state of the liquid crystal molecules, and the change of the polarization is converted into a change of light transmittance by a polarizer attached to both sides of the liquid crystal panel assembly 300, and thereby the pixel Px displays a luminance represented by a gray scale of the image signal DATA. The data voltage may be regarded as positive if the data voltage is greater than the common voltage or regarded as negative if the data voltage is less than the common voltage.

The exemplary embodiment of the above operation is repeatedly performed within a unit of a horizontal period 1H corresponding to one period of the horizontal synchronization signal Hsync and the data enable signal DE, such that the gate-on voltage Von is sequentially applied to all the gate lines G1-Gm and the image data voltage is applied to all the pixels, so as to display an image of one frame.

To prevent degradation of the liquid crystal, after one frame ends and/or before a subsequent frame is started, a state of the inversion signal RVS may be applied to the image data driver 500 to invert the polarity of the data voltage applied to each pixel Px. To improve display quality, when the liquid crystal panel assembly 300 displays images of one frame, column inversion where a data voltage having a different polarity is applied to neighboring data lines, or pixel inversion where a data voltage having a different polarity is applied to a neighboring pixel, may be used.

In one exemplary embodiment, the backlight unit 700 provides backlight to the liquid crystal and an inverter supplying a current to the backlight, and the backlight unit 700 may synchronize a synchronization signal of the image and an inverter driving signal. The backlight unit 700 may be included in a display device such as an LCD TV, a monitor, or other similar devices, for example.

Figure 3:
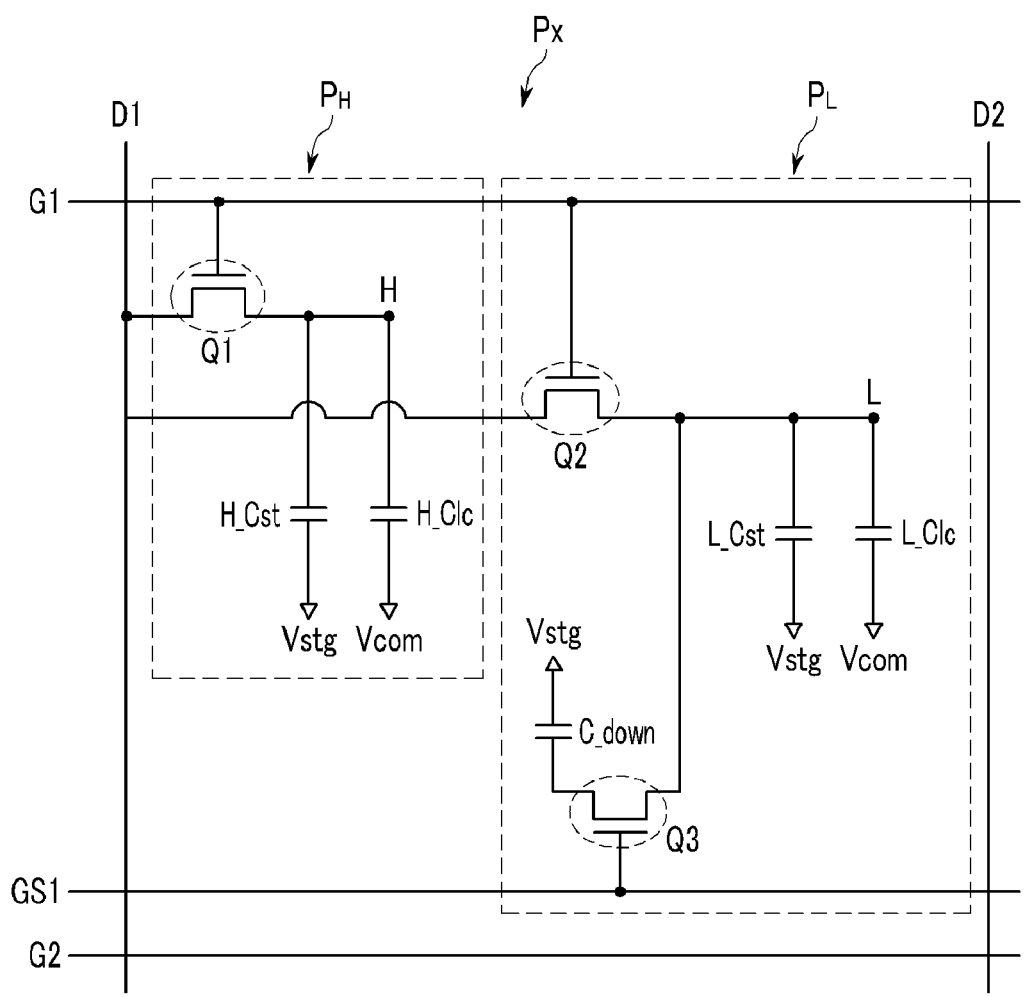
FIG. 3 is an equivalent circuit diagram of an exemplary embodiment of one pixel according to the present invention.

FIG. 2 and FIG. 3 are equivalent circuit diagrams of one exemplary embodiment of one pixel Px of an LCD according to the present invention. Referring to FIG. 2, the pixel Px includes a switching element Q connected to the signal lines G1-Gm and D1-Dn, a liquid crystal capacitor Clc, and a storage capacitor Cst. In one exemplary embodiment, the storage capacitor Cst may be omitted. In one exemplary embodiment, the switching element Q may be a three terminal element such as a TFT, for example. The switching element Q includes a control terminal connected to the gate lines G1-Gm, an input terminal connected to the data lines D1-Dm, and an output terminal connected to the liquid crystal capacitor Clc and the storage capacitor Cst.

The liquid crystal capacitor Clc may include a first electrode electrically connected to the output terminal of the switching element Q, a second electrode applied with the common voltage Vcom, and a liquid crystal layer injected between the first electrode and the second electrode.

Referring to FIG. 3, an exemplary embodiment of the pixel Px includes a first sub-pixel PH and a second sub-pixel PL. The first sub-pixel PH may include the first switching element Q1 connected to the signal lines G1-Gm and D1-Dn, and the first liquid crystal capacitor H_Clc and the first storage capacitor H_Cst connected thereto. In one exemplary embodiment, the first storage capacitor H_Cst may be omitted. In one exemplary embodiment, the first switching element Q1 may be a three terminal element such as a TFT, for example. The first switching element Q1 includes a control terminal connected to the gate line, an input terminal connected to the data line, and an output terminal connected to the first liquid crystal capacitor H_Clc and the first storage capacitor H_Cst.

The second sub-pixel PL may include the second switching element Q2 connected to the signal lines G1-Gm and D1-Dn, and the second liquid crystal capacitor L_Clc and the second storage capacitor L_Cst connected thereto. In one exemplary embodiment, the second storage capacitor L_Cst may be omitted. In one exemplary embodiment, the second switching element Q2 may be a three terminal element such as a TFT, for example. The second switching element Q2 includes a control terminal connected to the gate line, an input terminal connected to the data line, and an output terminal connected to the second liquid crystal capacitor L_Clc and the second storage capacitor L_Cst. In one exemplary embodiment, the second sub-pixel PL may further include the third switching element Q3 and a charge share capacitor C_down. In one exemplary embodiment, the third switching element Q3 may be a three terminal element such as a TFT, for example. The third switching element Q3 includes a control terminal connected to the charge share gate lines GS1-GSm, an input terminal connected to the output terminal of the second switching element, and an output terminal connected to the charge share capacitor C_down.

Figure 4:
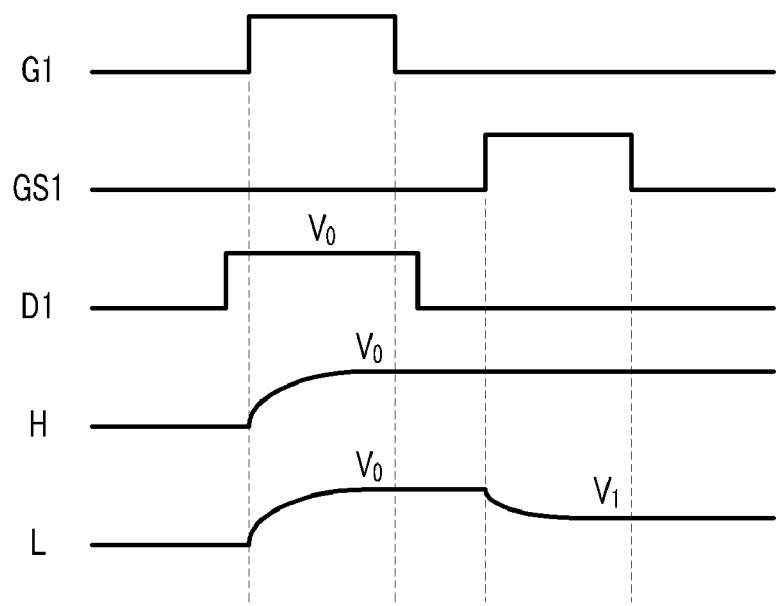
FIG. 4 is a timing diagram of an exemplary embodiment of signals applied to a pixel according to the present invention.

The operation of the pixel Px shown in FIG. 3 will be further described with reference to FIG. 3 and FIG. 4. FIG. 4 is a timing diagram of signals applied to the output terminal and the input terminal of the switching elements Q1, Q2, and Q3, and an output terminal voltage of Q1 and Q2. Referring to FIG. 4, the gate-on voltage Von voltage is applied to the control terminal of the first switching element Q1 and the control terminal of the second switching element Q2 through the gate line G1 during the time 1H or 3H according to exemplary embodiments, and simultaneously the data voltage $V_0$ is applied to the input terminal of the first switching element Q1 and the input terminal of the second switching element through the data line D1. The data voltage $V_0$ is transmitted to the first liquid crystal capacitor H_Clc, the first storage capacitor H_Cst, the second liquid crystal capacitor L_Clc, and the second storage capacitor L_Cst through the output terminal H of the first switching element Q1 and the output terminal L of the second switching element Q2, and the first liquid crystal capacitor H_Clc, the first storage capacitor H_Cst, the second liquid crystal capacitor L_Clc and the second storage capacitor L_Cst are charged with the data voltage $V_0$. After the gate-on voltage Von is maintained during the time 1H or 3H according to exemplary embodiments, the gate-off voltage Voff is applied to the control terminal of the first switching element Q1 and the control terminal of the second switching element Q2 through the gate line G1, and the voltage of the H terminal and the L terminal is maintained at the voltage $V_0$.

After a predetermined time from the time that the gate signal is converted from the gate-on voltage Von into the gate-off voltage Voff, the gate-on voltage Von or a voltage capable of turning on the third switching element Q3 is applied to the control electrode of the third switching element Q3 through the charge share gate line GS1. If the third switching element Q3 is turned-on, the charge share capacitor C_down, the second liquid crystal capacitor L_Clc and the second storage capacitor L_Cst, are electrically connected to each other such that the charges stored to the second liquid crystal capacitor L_Clc and the second storage capacitor L_Cst are moved to the charge share capacitor C_down, and thereby the voltage of the L terminal is changed into a voltage $V_1$ that may be greater than or lesser than the voltage $V_O$, i.e., the voltage of the L terminal is changed to be different than the voltage $V_O$. The liquid crystal molecules of the liquid crystal layer included in the first sub-pixel and the second sub-pixel of the pixel Px are applied with different voltages, and thereby the liquid crystal molecules in the first sub-pixel may be arranged in different directions from the liquid crystal molecules in the second sub-pixel. Accordingly, the LCD including the pixel having the first sub-pixel and the second sub-pixel may realize a desired wide viewing angle.

Figure 5:
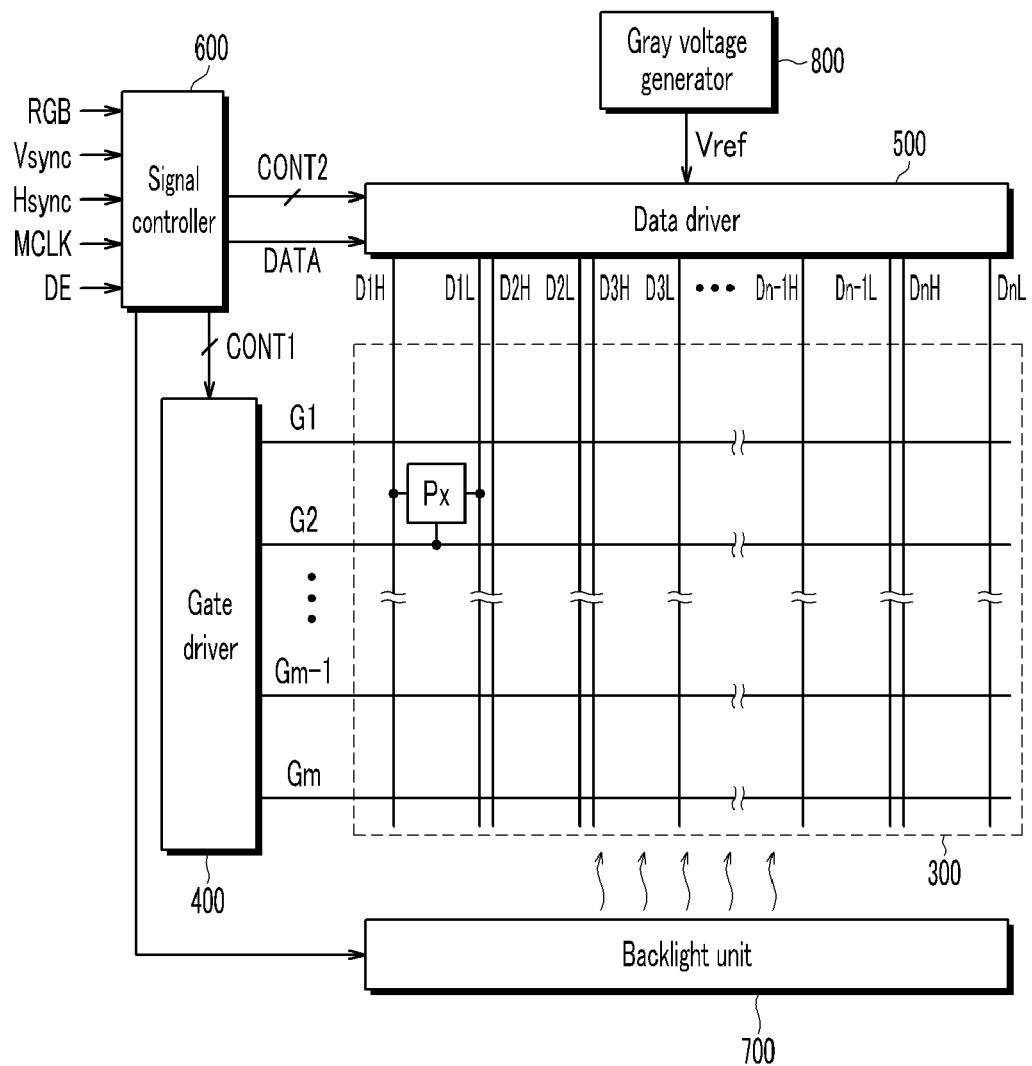
FIG. 5 is a block diagram of an exemplary embodiment of a display device according to the present invention.

FIG. 5 is a block diagram of another exemplary embodiment of an LCD according to the present invention. Referring to FIG. 5, an exemplary embodiment of an LCD according to the present invention includes a liquid crystal panel 300, a gate driver, a data driver 500, a signal controller 600, a backlight unit 700, and a gray voltage generator 800.

Referring to FIG. 5, one exemplary embodiment of the liquid crystal panel assembly 300 includes a plurality of signal lines G1-Gm, D1H-DnH, and D1L-DnL, and a plurality of pixels Px each connected to the plurality of signal lines and arranged in an approximate matrix shape. The signal lines G1-Gm, D1H-DnH, and D1L-DnL include a plurality of gate lines G1 to Gm for delivering gate signals (also referred to as "scan signals") and a plurality of data lines D1H-DnH and D1L-DnL for delivering data signals. The gate lines G1 to Gm extend in a row direction and are substantially parallel to each other, and the data lines D1H-DnH and D1L-DnL extend in a column direction and substantially parallel to each other.

Still referring to FIG. 5, the gray voltage generator 800 generates all gray voltages or a predetermined number of the gray voltages of the pixels Px. In one exemplary embodiment, the gray voltages may include one set of the gray voltages having a positive value with respect to the common voltage Vcom, while another set of the gray voltages having a negative value with respect to the common voltage Vcom.

The gate driver 400 is connected to gate lines G1-Gm of the liquid crystal panel assembly 300, and applies a gate signal which is one of a gate-on voltage Von and a gate-off voltage Voff to the gate lines G1-Gm.

The data driver 500 is connected to the data lines D1H-DnH and D1L-DnL of the liquid crystal panel assembly 300, and selects a gray voltage from the gray voltage generator 800 and applies the gray voltage as the data voltage to the data lines D1H-DnH and D1L-DnL. However, in an exemplary embodiment wherein the gray voltage generator 800 provides only a limited number of reference gray voltages instead of all the gray voltages, the data driver 500 generates a desired data voltage by dividing the reference gray voltages. The backlight unit 700 provides light to the liquid crystal panel assembly 300. The signal controller 600 controls the gate driver 400, the data driver 500 and the backlight unit 700.

Figure 6:
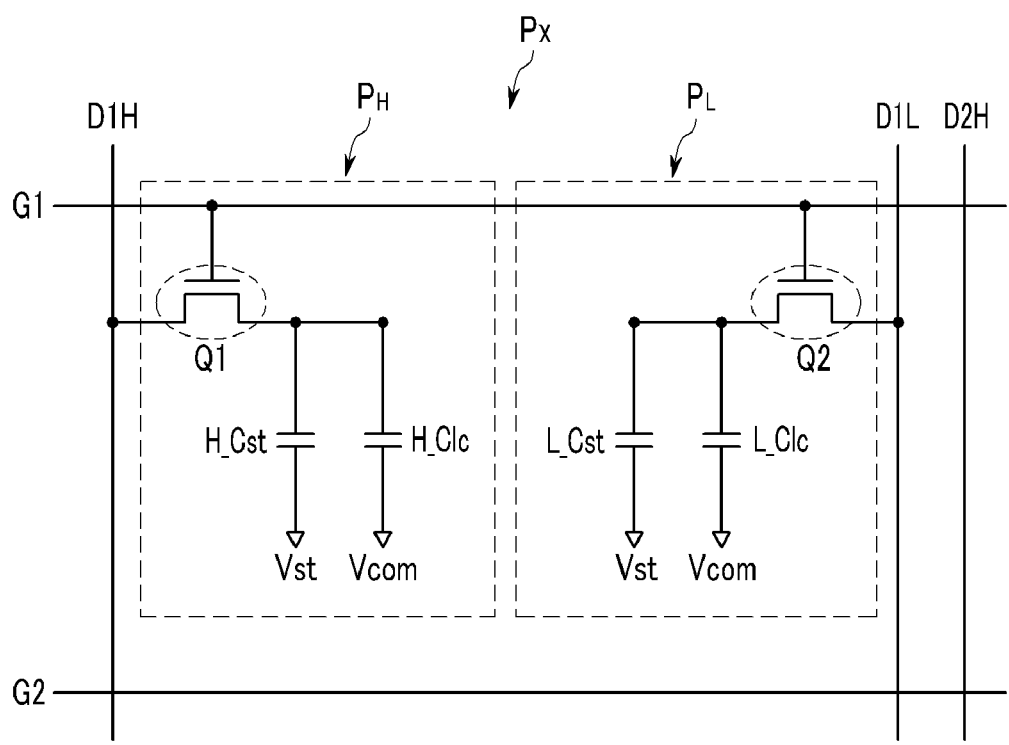
FIG. 6 is an equivalent circuit diagram of an exemplary embodiment of one pixel according to the present invention.

FIG. 6 is an equivalent circuit diagram of an exemplary embodiment of one pixel Px of an LCD according to the present invention. Similar to the exemplary embodiments shown in FIG. 5 and FIG. 6, the pixel Px may include the first sub-pixel $P_H$ and the second sub-pixel $P_L$. The first sub-pixel $P_H$ includes the first switching element Q1 connected to the signal lines G1-Gm and D1H-DnH, and the first liquid crystal capacitor H_Clc and the first storage capacitor H_Cst connected thereto. In one exemplary embodiment, the first storage capacitor H_Cst may be omitted. In one exemplary embodiment, the first switching element Q1 may be a three terminal element such as a TFT, for example. The first switching element Q1 includes a control terminal connected to the gate line, an input terminal connected to the data line, and an output terminal connected to the first liquid crystal capacitor H_Clc and the first storage capacitor H_Cst.

The second sub-pixel PL includes the second switching element Q2 connected to the signal lines G1-Gm and D1L-DnL, and the second liquid crystal capacitor L_Clc and the second storage capacitor L_Cst connected thereto. In one exemplary embodiment, the second storage capacitor L_Cst may be omitted. In one exemplary embodiment, the second switching element Q2 may be a three terminal element such as a TFT, for example. The second switching element Q2 includes a control terminal connected to the gate line, an input terminal connected to the data line, and an output terminal connected to the second liquid crystal capacitor L_Clc and the second storage capacitor L_Cst. The first sub-pixel is connected to the first data line D1H, and the second sub-pixel is connected to the second data line D1L such that the liquid crystal capacitors included in the first sub-pixel and the second sub-pixel of the pixel Px may be applied with different voltages. Accordingly, liquid crystal molecules of the liquid crystal layer included in the first sub-pixel are arranged in the different directions from liquid crystal molecules of the liquid crystal layer included in the second sub-pixel. Therefore, the LCD having the pixel including the first sub-pixel and the second sub-pixel may realize the desired wide viewing angle.

Figure 7:
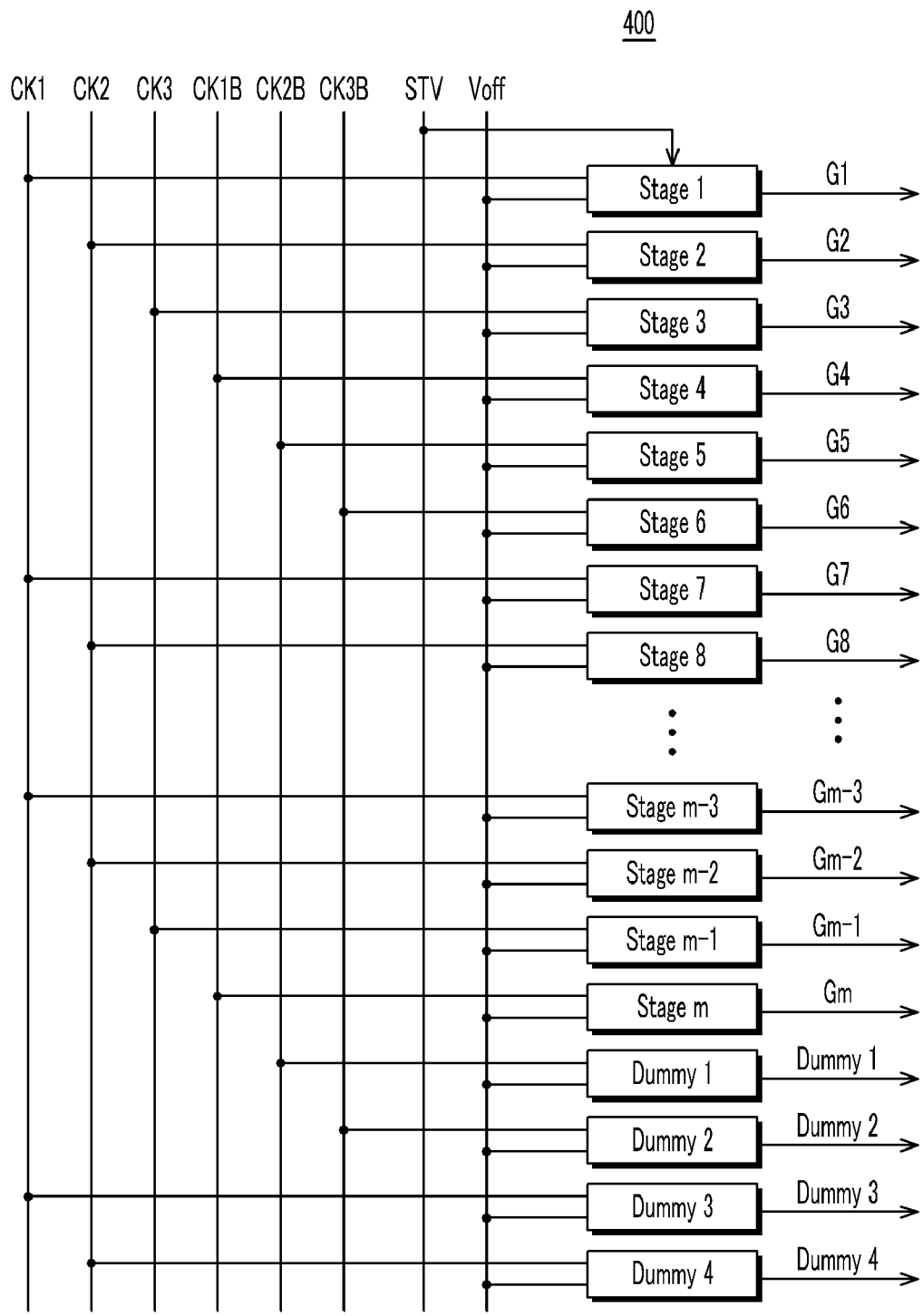
FIG. 7 is a block diagram of an exemplary embodiment of a gate driver.

FIG. 7 is a block diagram of an exemplary embodiment of a gate driver 400 according to the present invention. The gate driver 400 transmits the gate-on voltage Von and the gate-off voltage Voff to each gate line G1-Gm. The gate driver 400 may include a plurality of stages stage 1-stage m respectively electrically connected to a plurality of gate lines G1-Gm. The gate driver 400 may include an image scanning start signal STV to instruct of the start of image scanning, and at least one clock signal to control an output cycle of the gate-on voltage. The clock signal may include the first clock signal CK1 and the first inversion clock signal CK1B having a phase difference of 180 degrees for the first clock signal. Also, the clock signal may include the second clock signal CK2 having the phase difference of 60 degrees for the first clock signal CK1 and the third clock signal CK3 having the phase difference of 120 degrees for the first clock signal CK1, and may include the second inversion clock signal CK2B having the phase difference of 180 degrees for the second clock signal CK2 and the third inversion clock signal CK3B having the phase difference of 180 degrees for the third clock signal CK3. The maximum voltage of each clock signal may be the gate-on voltage Von.

Figure 8:
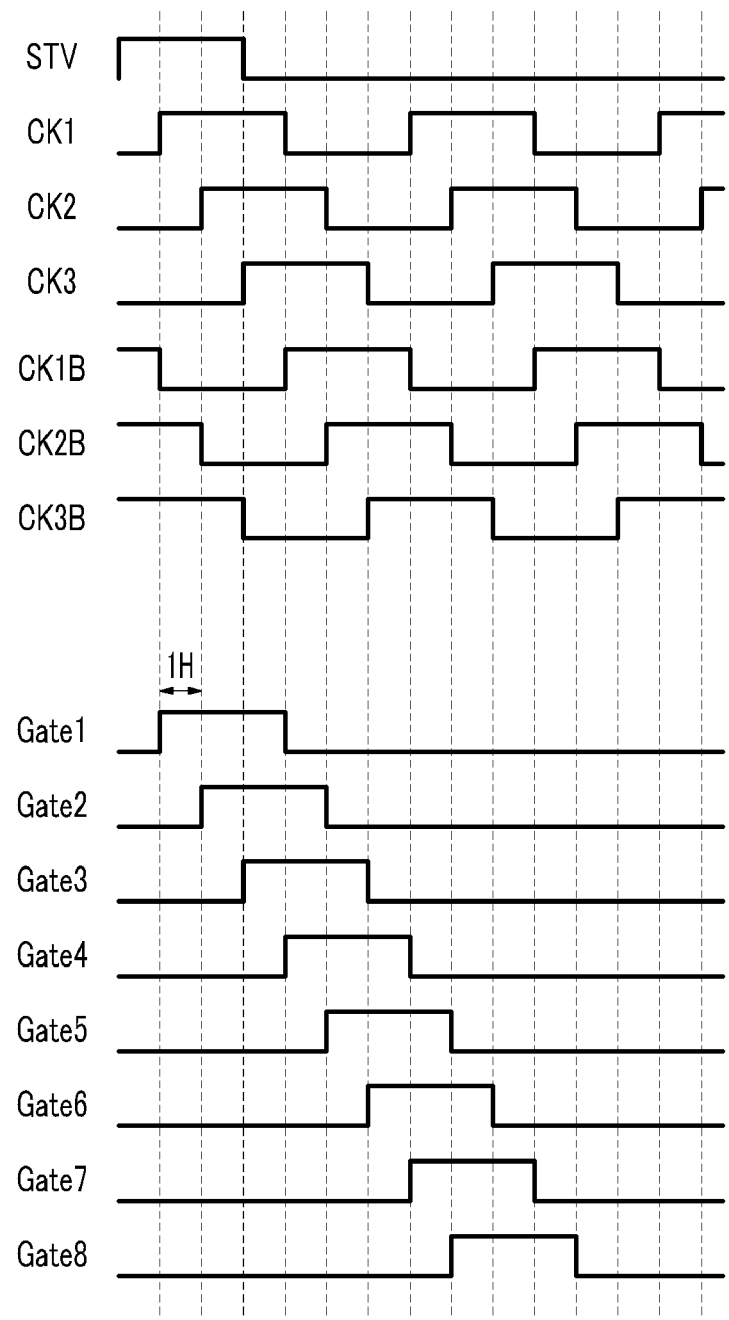
FIG. 8 is a timing diagram of an exemplary embodiment of signals input to a gate driver and output signals.

FIG. 8 shows a timing waveform of an exemplary embodiment of a gate driving signal gate driver output signal according to the present invention. Referring to FIG. 7 and FIG. 8, each stage of the gate driver applies the gate-on voltage Von to the gate line electrically connected thereto during time of 3H. A plurality of gate lines are arranged parallel to each other in a row direction such that the gate-on voltage is applied to the adjacent gate line by a time difference of 1H. The gate-on voltage transmitted to the adjacent gate line may be overlapped with each other, or not according to the various exemplary embodiments. The gate-on voltage transmitted to the adjacent gate line may be overlapped during the time of 2H, and may be overlapped during various times according to exemplary embodiments.

Figure 9A:
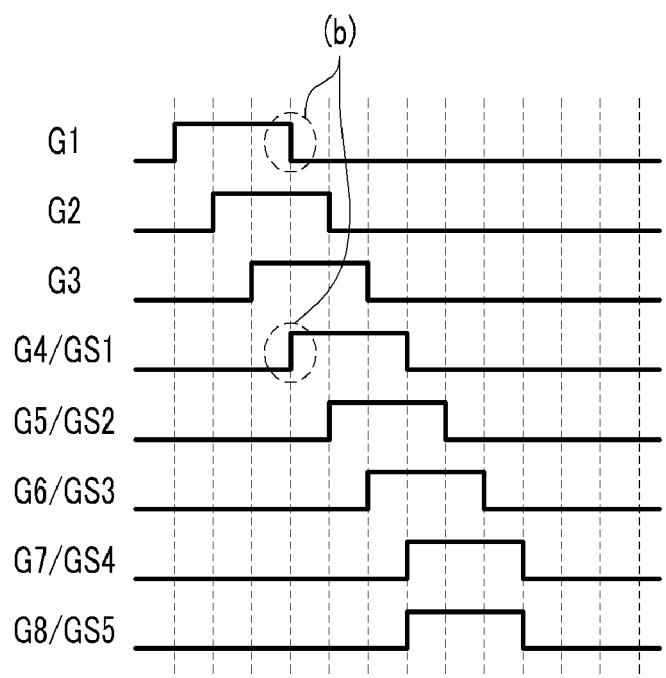
FIG. 9A through 9C are timing diagrams of an exemplary embodiment of a gate driver output signal according to the present invention.

FIG. 9 is a waveform diagram of an exemplary embodiment of a gate signal and a charge share gate signal according to the present invention. Referring to FIG. 3 and FIG. 9, a gate signal applied to the charge share gate line GS1 which forms a pair along with the gate line G1 may share a gate signal transmitted to another gate line that is not the gate line that is part of the pair with the charge share gate line GS1, e.g., the gate share line GS1 may share a gate signal with the second gate line GS2 or another gate line. Accordingly, the gate driver may supply the driving signal to the another gate line and the charge share gate line without the usage of an additional driving circuit. Referring to FIG. 9A, the charge share gate line GS1 of the first pixel connected to the first gate line G1 is supplied with the gate signal supplied with the fourth gate line G4 such that the pixel of FIG. 3 may be driven.

Figure 9B:
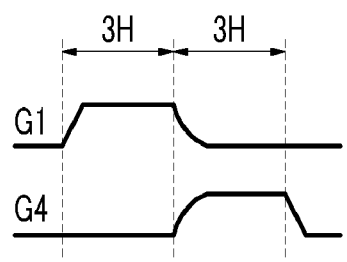
Figure 9C:
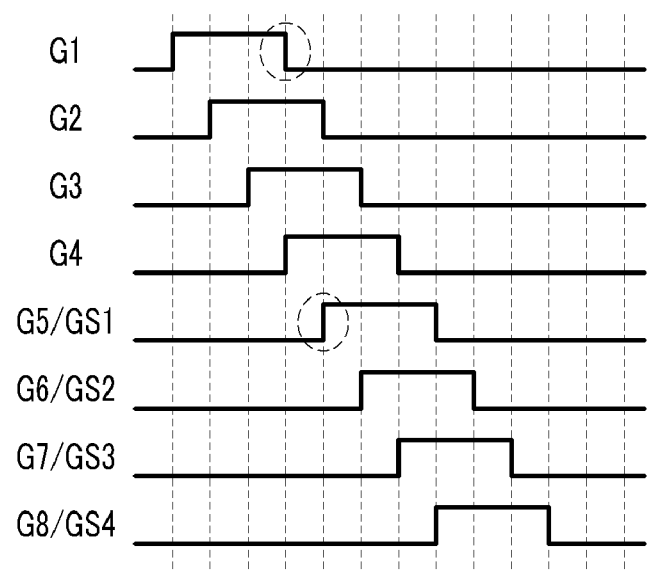

Referring to FIG. 9B, when the gate signal is applied to the gate line in each stage, the gate signal applied to a gate line and another gate signal applied to another gate line may be overlapped due to an impedance of the gate line, where the another gate line is connected to a charge share gate signal forming a pair of the gate line. When the overlapping gate signals are supplied to one pixel as the gate signal and the charge share gate signal, the data voltage may be transmitted from the data line to the charge share capacitor. As shown in FIG. 9C, two signals, e.g., G1 and G5, having the time difference of 1H between time that the gate-on voltage is converted into the gate-off voltage in one signal, e.g., G1, and time that the gate-off voltage is converted into the gate-on voltage in the other signal, e.g., G5, are forming a pair of a gate signal and the charge share gate signal such that the overlapping of the gate signal, e.g., G1, and the charge share forming the pair, e.g., GS1, may be prevented. Referring to FIG. 7 and FIG. 9C, to use the signals output from the gate driver 400 as the gate signal and the charge share gate signal, an additional dummy stage may be used. The output signals of the dummy stage are supplied to the pixel thereby being used as the charge share gate signal.

Another exemplary embodiment of a display device according to the present invention will be described with reference to FIG. 10 and FIG. 11.

Figure 10:
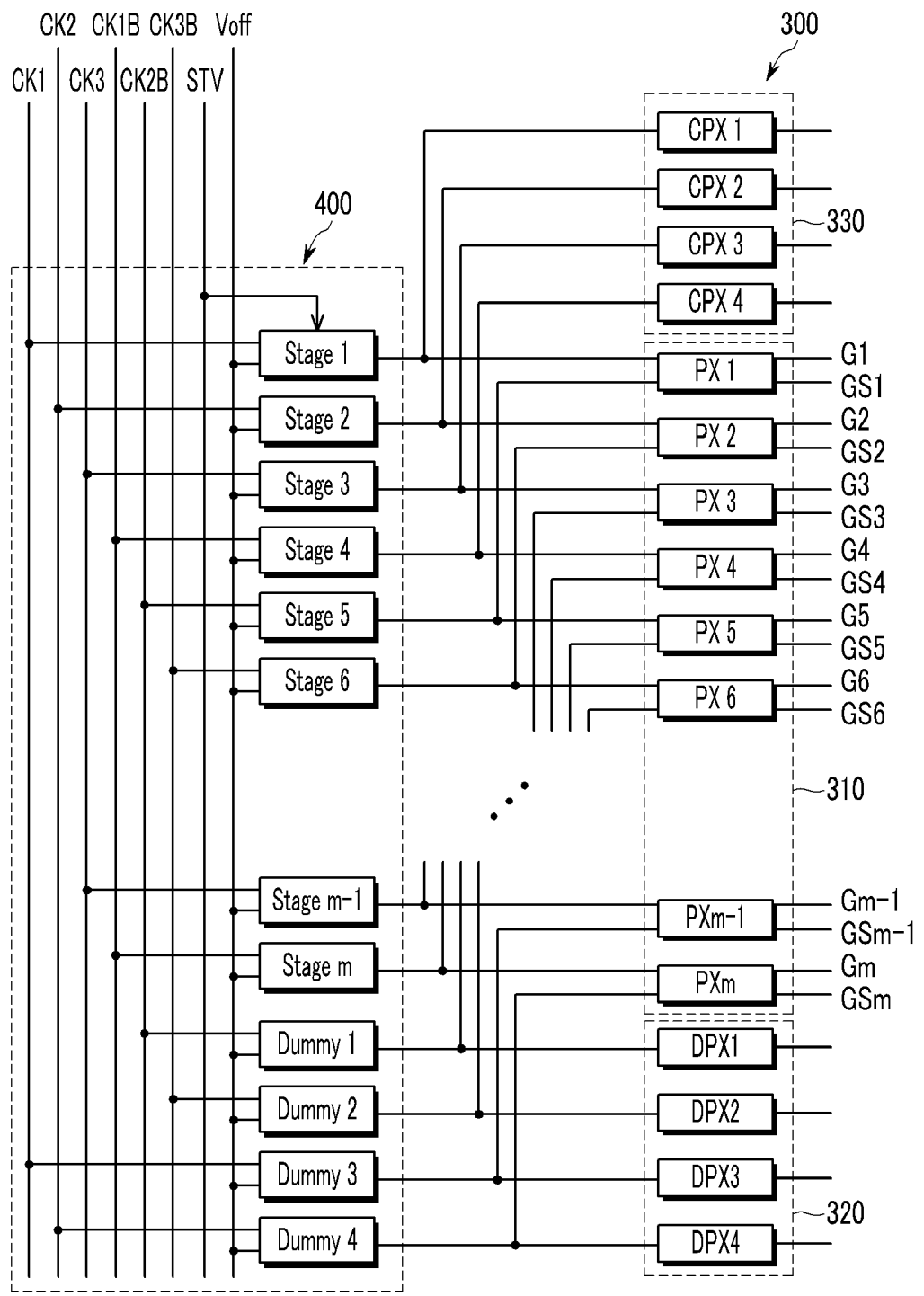
FIG. 10 is a block diagram of an exemplary embodiment of a display device according to the present invention.

First, FIG. 10 shows the additional exemplary embodiment of the display device having a plurality of pixel rows including the charge share gate line GS1-GSm, the third switching element Q3, and the charge share capacitor C_down similar to the exemplary embodiment described with respect to FIG. 3, and the exemplary embodiment that the signal applied to the charge share gate line GS1-GSm and the signal applied to the gate line G1-Gm do not overlap with each other and the signals separated from each other by the time 1H are applied like FIG. 9C.

FIG. 10 is a block diagram of an exemplary embodiment a display device according to the present invention. FIG. 10 focuses on the gate driver 400 and the liquid crystal panel assembly 300, and the other constituent elements may be omitted.

In FIG. 10, PX represents a pixel row displaying images, PX1 represents a first pixel row, and PX2 represents a second pixel row. On the other hand, CPX represents a dummy cap pixel row to compensate a capacitance, CPX1 represents a first dummy cap pixel row, and CPX2 represents a second dummy cap pixel row. Also, DPX has a same structure as the general pixel row, however it represents the dummy pixel row that does not actually display the image, DPX1 represents a first dummy pixel row, and DPX2 represents a second dummy pixel row. Here, the PX is formed in a display area 310, CPX is formed in an upper region 330 of liquid crystal panel assembly 300, and DPX is formed in a lower region 320 of the liquid crystal panel assembly 300.

First, a gate driver 400 of FIG. 10 will be described. The gate driver 400 may be disposed on one side of the liquid crystal panel assembly 300, and may be together integrated in a process forming the pixel row of the display area 310.

The gate driver 400 of FIG. 10 is applied with the signals STV, CK1, CK2, CK3, CK1B, CK2B, CK3B, and Voff like the timing diagram of the embodiment shown in FIG. 8, and may sequentially output the gate voltage that overlaps by the time of 2H through each stages Stage 1-Stage m and each of the dummy stages Dummy 1-Dummy 4.

Still referring to FIG. 10, the charge share gate lines GS1-GSm are each connected to the output gate voltage of fourth stage and following stages of gate driver 400 to apply the signals to the charge share gate lines GS1-GSm. That is, the gate line G1 of the first pixel row PX1 is applied with the output gate voltage of the first stage Stage 1, however the charge share gate line GS1 is applied with the output gate voltage of the fifth stage Stage 5. As a result, with respect to one pixel row, the stages that are respectively connected to the gate line and the charge share gate line, e.g., stage 1 and stage 5 have three stages, e.g., stages 2 to 4, therebetween. As described above, the reason for crossing over three stages is to separate the period that the gate line G1 is applied with the gate-on voltage and the period that the charge share gate line GS1 is applied with the gate-on voltage from each other by the time of 1H thereby not being overlapped, as shown in FIG. 9C. If two periods overlap each other, the data voltage is applied to the charge share capacitor C_down through the third switching element Q3 of FIG. 3, and as a result, the voltage of the pixel electrode of the one side is not changed by the charge share capacitor C_down such that two subpixels display the same gray, and thereby the viewing angle is not improved.

As described above, when connecting the signal lines while crossing over three stages, four dummy stages Dummy 1-4 are required to apply the gate-on voltage to the charge share gate line of four pixel rows among the pixel rows disposed at the lower side 320. An exemplary embodiment of the dummy stages Dummy 1-4 are disposed below the gate driver 400 of FIG. 10. The dummy stages Dummy 1-4 have a same structure as the general stages Stage 1-Stage m, and receive a same voltage from the signal controller 600.

Also, a gate voltage output from the dummy stage Dummy 1-4 is applied to the charge share gate line of the general pixel row, and is also equally applied to the gate lines of the dummy pixel rows DPX1-DPX4. The dummy pixel rows DPX1-DPX4 have a same structure as the general pixel row, however they are not used as the pixel row to display of the image as the pixel row, and are disposed outside the display area (e.g., at the lower region 320). The reason that an output gate voltage of the dummy stages Dummy 1-4 is applied to the dummy pixel rows DPX1-DPX4 is to provide a same impedance as that of the gate voltage outputs from the different stages Stage 1-Stage m, and thereby the output gate voltage has same characteristics.

The first stage Stage 1 to the fourth stage Stage 4 not only apply an output gate voltage to the first to fourth pixel rows PX1-PX4, but also apply a gate voltage to dummy cap pixel rows CPX1-CPX4 that are disposed on the upper region 330.

Figure 11:
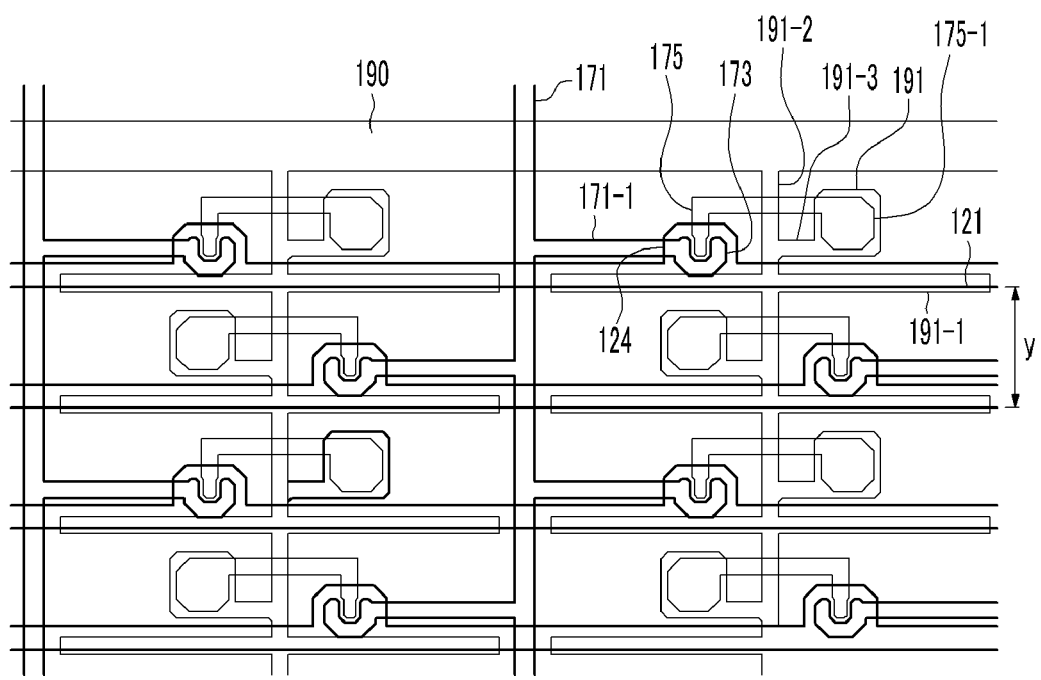
FIG. 11 is a schematic view of an exemplary embodiment of dummy wiring according to the present invention.

In one exemplary embodiment, the dummy cap pixel rows CPX1-CPX4 are formed to have a same capacitance value or a same impedance value as the general pixel rows PX1-PXm, thereby having a same structure as shown in FIG. 11.

The dummy cap pixel rows CPX1-CPX4 exist such that output gate voltages of the first to fourth stages Stage 1-Stage 4 do not have different impedances from impedances of outputs of the other stages. As a result, the output gate voltage of the first to fourth stages Stage 1-Stage 4 has a same characteristic as the different output gate voltage.

FIG. 11 is a layout view of an exemplary embodiment of a structure of a dummy cap pixel row according to the present invention.

Referring to an exemplary embodiment of a structure of a dummy cap pixel row of FIG. 11, a gate line 121 parallel to the gate line G1-Gm of the display area is formed. A portion of the gate line 121 is extended into the upper side of the pixel, e.g., an extension of the gate line 121 extends substantially perpendicularly away from a remaining portion of the gate line, thereby forming a gate electrode 124. A data line 171 of the display area is extended into the upper side, thereby passing through the dummy cap pixel row, and the data line 171 of the dummy cap pixel row has a branch 171-1 that is extended into the left and right sides, and a source electrode 173 having a "U" shape is formed on the end of the branch 171-1. One end of the drain electrode 175 is positioned at the region enclosed by the source electrode, the drain electrode is curved by about 90 degrees and is extended, e.g., the end of the drain electrode 175 extends substantially perpendicularly away from a remaining portion of the drain electrode, and an expansion 175-1 is formed on the other end thereof. The semiconductor layer is formed on the gate electrode 124, and forms a transistor along with the source electrode 173 and the drain electrode 175.

The expansion 175-1 of the drain electrode 175 forms one electrode of the capacitor, and an opposed electrode 191 forming the other electrode of the capacitor is disposed thereon. The opposed electrode 191 is connected to the longitudinal branch 191-2 through the expansion 191-3, and the longitudinal branch 191-2 has a transverse branch 191-1 overlapping the gate line 121. The longitudinal branch 191-2 transverses and extends the plurality of gate lines 121 for the opposed electrodes 191 formed in the longitudinal direction to be connected to each other. Also, one end of the longitudinal branch 191-2 is electrically connected to the connection 190 such that the opposed electrodes 191 formed in the horizontal direction are electrically connected to each other. As a result, the capacitors formed in the dummy cap pixels row CPX1-CPX4 are all electrically connected to each other.

Differently from the exemplary embodiment of FIG. 11, an exemplary embodiment of a dummy pixel may also be disposed at the upper region 330 of the liquid crystal panel assembly 300, as disposed at the lower region 320 in the one embodiment. When forming the dummy pixel as described above, the charge share gate line of the dummy pixel formed in the upper region 330 is applied with the output gate voltage of the first to fourth stages Stage 1-Stage 4. However, in the present exemplary embodiment, a total of four rows of dummy pixel are formed, and thereby a wider area than that of FIG. 11 may be needed. That is, although the dummy pixel does not display the image, a predetermined space is occupied while forming the pixel electrode such that the wider area than the structure of FIG. 11 may be needed. If this area is sufficient, the dummy pixel may be formed in the upper region 330, however a fan-out region to which the plurality of wires are connected from the data driver 500 on the upper region 330 is formed such that it is difficult to obtain sufficient area. Therefore, although the structure of FIG. 11 is applied and it is formed in a smaller area, a same effect of a same capacitance or the same impedance may be realized. In FIG. 11, y represents a height of one row and may be changed according to other exemplary embodiments. In one exemplary embodiment y has a value of about 51.5 micrometers (μm) in one exemplary embodiment. In one exemplary embodiment, the height of the pixel of the display area is about 630 μm such that the size of one pixel may be remarkably reduced.

On the other hand, in the exemplary embodiment wherein the structure with the plurality of wires formed like a fan-out region is formed under the lower region 320, the lower region 320 may have the structure conforming to FIG. 11.

Also, the structure of the dummy cap pixel row shown in FIG. 11 may be formed corresponding to a structure formed in the central part of the charge share gate line among the pixel row of the display area, so as to have a same or similar capacitance or impedance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a plurality of gate lines arranged substantially parallel to each other in a first direction;
   a plurality of charge share gate lines arranged substantially parallel to each other in the first direction;
   a plurality of data lines arranged substantially parallel to each other in a second direction, wherein the second direction is substantially perpendicular to the first direction; and
   a plurality of pixels arranged in a matrix form along the first direction and the second direction and each of the plurality of pixels which includes a first switching element and a second switching element,
   wherein a gate line of the plurality of gate lines is electrically connected to the first switching element included in an individual pixel of the plurality of pixels, and a charge share gate line of the plurality of charge share gate lines is electrically connected to the second switching element included in the individual pixel of the plurality of pixels, and an output terminal of the second switching element is directly connected to only a single charge share capacitor,
   the plurality of pixels include a plurality of pixel rows disposed in the display area and the plurality of pixel rows are arranged substantially in parallel,
   each pixel row is connected to one gate line and one charge share gate line, and
   wherein the plurality of pixels further include a plurality of dummy cap pixel rows disposed on one side of a liquid crystal panel assembly, each of the plurality of dummy cap pixel rows is substantially parallel to one another and includes a plurality of dummy cap pixels, capacitors in the plurality of dummy cap pixel rows are all electrically connected to each other, and all capacitors in the plurality of dummy cap pixel rows are directly connected to a same electrode, and
   transistors in the plurality of dummy cap pixel rows are electrically connected to corresponding gate line of the plurality of gate lines which is electrically connected to the first switching element included in an individual pixel of the plurality of pixels.

2. The display device of claim 1, further comprising:
   a gate driver which supplies a first gate signal to the gate line and a second gate signal to the charge share gate line.

3. The display device of claim 2, wherein
   the first gate signal and the second gate signal include at least one of a turn-on voltage and a turn-off voltage.

4. The display device of claim 3, wherein
   a period when the first gate signal is the turn-on voltage and a period when the second gate signal is the turn-on voltage do not entirely overlap each other.

5. The display device of claim 1, wherein
the first switching element is electrically connected to at least one data line of the plurality of data lines.
6. The display device of claim 5, wherein
each of the plurality of pixels further include a third switching element.
7. The display device of claim 6, wherein
the third switching element is electrically connected to a same data line and a same gate line connected to the first switching element.
8. The display device of claim 7, wherein
the third switching element and the second switching element are electrically connected to each other via drain to input terminals.
9. A display device comprising:
a liquid crystal panel assembly including a plurality of pixels disposed in a display area, wherein the plurality of pixels are each respectively connected to a gate line and a charge share gate line; and
a gate driver which applies a gate voltage to the gate line and the charge share gate line,
wherein the gate voltage applied through the gate line and the gate voltage applied through the charge share gate line each connected to one pixel of the plurality of pixels have gate-on voltage periods, respectively, and there is 1H time between a falling edge of the gate-on voltage period applied to the gate line and a rising edge of the gate-on voltage period applied to the charge share gate line,
the plurality of pixels include a plurality of pixel rows disposed in the display area and the plurality of pixel rows are arranged substantially in parallel,
each pixel row is connected to one gate line and one charge share gate line,
wherein the gate line is electrically connected to a first switching element included in an individual pixel of the plurality of pixels, and the charge share gate line is electrically connected to a second switching element included in the individual pixel of the plurality of pixels, and an output terminal of the second switching element is directly connected to only a single charge share capacitor, and
the plurality of pixels further include a plurality of dummy cap pixel rows disposed on one side of a liquid crystal panel assembly, each of the plurality of dummy cap pixel rows is substantially parallel to one another and includes a plurality of dummy cap pixels, capacitors in the plurality of dummy cap pixel rows are all electrically connected to each other, and all capacitors in the plurality of dummy cap pixel rows share are directly connected to a same electrode.
10. The display device of claim 9, wherein
the gate driver includes a plurality of stages, and
the plurality of stages include a plurality of general stages connected to the gate lines one by one.
11. The display device of claim 10, wherein
outputs of the plurality of general stages connected to the gate lines are sequentially applied to the charge share gate lines one by one.
12. The display device of claim 11, wherein
three stages exist between two stages connected to one gate line and one charge share data line, respectively, wherein the gate line connected to the one stage of the two stages and the charge share data line connected to the other stage of the two stages are connected to one pixel row.
13. The display device of claim 9, wherein
the plurality of pixels further include a plurality of dummy pixel rows disposed on one side of the liquid crystal panel assembly and arranged in one line.
14. The display device of claim 13, wherein
each row of the plurality of dummy pixel rows has a same structure as that of each row of the plurality of pixel rows.
15. The display device of claim 14, wherein
a plurality of stages include a plurality of general stages connected to the gate lines one by one
the plurality of stages further include a plurality of dummy stages connected to the plurality of dummy pixel rows one by one.
16. The display device of claim 15, wherein
the plurality of dummy stages are connected to the plurality of charge share gate lines connected to the plurality of pixel rows one by one.
17. The display device of claim 9, wherein
the plurality of dummy cap pixel rows is each connected to a stage of the plurality of stages that is not connected to a charge share gate line of the charge share gate lines of the plurality of pixel rows among the plurality of stages.
18. The display device of claim 17, wherein
each dummy cap pixel row is formed to have at least one of a same capacitance and a same impedance as the general pixel rows based on a structure where the charge share gate line is a central portion of a structure of the pixel row.
19. The display device of claim 9, further comprising:
a data line which is disposed substantially perpendicular to the gate line and the charge share gate line;
a first switching element which includes a first transistor and a second switching element which includes a second transistor, and each connected to the gate line and the data line;
a first sub-pixel electrode connected to the first transistor;
a second sub-pixel electrode connected to the second transistor; and
a third switching element connected to the second sub-pixel electrode and the charge share gate line.
20. The display device of claim 19, further comprising:
a charge share capacitor,
wherein one terminal of the third switching element is connected to the charge share capacitor.
21. The display device of claim 9, wherein
each of the plurality of dummy cap pixel rows includes transistors, wherein the end of the drain electrode of each of the transistors extends and forms an expansion which is one electrode of one of the capacitors and on which an opposed electrode of the capacitor is disposed.
22. The display device of claim 21, wherein
the opposed electrode is connected to a longitudinal branch through its expansion and the longitudinal branch has a traverse branch overlapping a gate line.
23. The display device of claim 22, wherein
the longitudinal branch transverses and extends a plurality of gate lines for the opposed electrodes of the capacitors disposed in a longitudinal direction to be connected to each other.
24. The display device of claim 1, wherein
each of the plurality of dummy cap pixel rows includes transistors, wherein the end of the drain electrode of each of the transistors extends and forms an expansion which is one electrode of one of the capacitors and on which an opposed electrode of the capacitor is disposed.

25. The display device of claim 24, wherein the opposed electrode is connected to a longitudinal branch through its expansion and the longitudinal branch has a traverse branch overlapping a gate line.

26. The display device of claim 25, wherein the longitudinal branch transverses and extends a plurality of gate lines for the opposed electrodes of the capacitors disposed in a longitudinal direction to be connected to each other.

* * * * *